US007713618B2

(12) United States Patent
Bharadwaj et al.

(10) Patent No.: US 7,713,618 B2
(45) Date of Patent: May 11, 2010

(54) SACRIFICIAL COATINGS FOR MAGNESIUM COMPONENTS

(75) Inventors: Mridula D. Bharadwaj, Karnataka (IN); Anil K. Sachdev, Rochester Hills, MI (US); Mark W. Verbrugge, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 479 days.

(21) Appl. No.: 11/550,817

(22) Filed: Oct. 19, 2006

(65) Prior Publication Data

US 2008/0096036 A1 Apr. 24, 2008

(51) Int. Cl.
*B32B 15/08* (2006.01)

(52) U.S. Cl. ....................... 428/330; 428/323; 428/457; 428/469

(58) Field of Classification Search ....................... None
See application file for complete search history.

(56) References Cited

U.S. PATENT DOCUMENTS 2,011,613 A * 8/1935 Brown et al. ........... 204/196.18
3,887,449 A * 6/1975 Baer ........................... 205/50
6,335,099 B1 * 1/2002 Higuchi et al. .............. 428/469
6,627,117 B2 9/2003 Geer et al.
7,150,918 B2 * 12/2006 Brady ......................... 428/457
2005/0161641 A1 * 7/2005 Gros .......................... 252/500

FOREIGN PATENT DOCUMENTS

KR 2004094105 A * 11/2004

OTHER PUBLICATIONS

Vohler et al, Carbon, Ullman's Encyclopedia of Industrial Chemistry, Jan. 15, 2002, Wiley, Section 4.3, pp. 40-42.*
E.Albert Cotton, Geoffrey Wilkinson, Advanced Inorganic Chemistry, Fifth Edition, p. 238.
Mark W. Vergrugge, Brian J. Koch, Electrochemical Analysis of Lithiated Graphite Anodes, Journal of the Electrochemical Society, 150 (3) 1-0 (2003).

* cited by examiner

*Primary Examiner*—Monique R Jackson
(74) *Attorney, Agent, or Firm*—Reising Ethington P.C.

(57) ABSTRACT

The surface of a magnesium or magnesium alloy part is protected from corrosion by a coating of adherent, electrically conductive material that is electrolytically anodic to the magnesium-containing substrate. For example, the magnesium alloy has a microstructure with portions that are anodic and cathodic to each other, but the coating contains species (e.g., lithiated graphite particles in a polymeric binder) that are anodic to all phases in the magnesium alloy microstructure so that when the coating is damaged and the part surface is exposed, the coating is sacrificially consumed by electrochemical corrosion and the part is spared.

8 Claims, 1 Drawing Sheet

SACRIFICIAL COATINGS FOR MAGNESIUM COMPONENTS

TECHNICAL FIELD

This invention relates to protective coatings for magnesium and magnesium alloy articles. More specifically this invention pertains to the provision of such coatings that are anodic with respect to a magnesium substrate and corrode sacrificially when the coating is damaged and the magnesium alloy surface exposed, for example, to a water-containing environment.

BACKGROUND OF THE INVENTION

Magnesium and its alloys offer the combination of low specific gravity and relatively high strength for automotive body panels and other useful components. But magnesium alloys are subject to oxidation and other corrosive reactions in the often humid, oxidizing outdoor environment to which such automobile components are exposed. Further, magnesium is electrochemically anodic with respect to many other materials that might be used to cover or isolate the magnesium or magnesium alloy from oxidation.

Ferrous metal and other metals used in vehicle components can often be protected from corrosive attack by coating systems that are anodic to the structural metal portion of the part. For example, anodic zinc coatings are applied (galvanizing) to iron and steel parts to provide protection against corrosion of the base cathodic part for substantial periods of time. In this layered combination of zinc surface coating and iron substrate, the zinc is consumed first by water-promoted or air-promoted oxidation at the exposed surface of the part. Zinc is oxidized to a salt or other non-useful material and, thus, consumed sacrificially for protection of the underlying, stronger functioning material of the vehicle part. But no such anodic coating material has been discovered for magnesium and magnesium alloy parts and components.

The surfaces of magnesium alloy components can be painted or otherwise provided with barrier-type organic-based coatings or other barrier coatings, for protection that lasts as long as the coextensive coverage of the coating is maintained. But when some portion of the barrier coating is damaged and that portion of the underlying part is exposed, the exposed magnesium is anodic with respect to its surroundings and undergoes severe local corrosion which may be more damaging to the component than if it had not been coated in the first instance. There remains a need for more protective coatings for magnesium and magnesium alloy parts, coatings that are anodic in a water-containing environment to the underlying magnesium substrate.

SUMMARY OF THE INVENTION

A sacrificial coating is provided for magnesium and magnesium alloy articles of manufacture. The coating is especially useful where the article is exposed to humid (or humid and salty) outdoor environments. Such articles would include automotive vehicle components like body panels and under-vehicle parts. The coating contains species or constituents that are anodic with respect to magnesium so that when the coating is damaged and uncoated magnesium-containing surface is exposed, the coating is corrosively attacked by electrochemical action and the underlying part is spared. Thus, when, for example, salty water enters a hole in the coating and contacts a magnesium-rich surface, an electrochemical cell is formed. But it is the anodic coating (or a constituent of the coating) that is oxidized and consumed, while the reduction reaction at the cathodic magnesium substrate protects the surface of the part as long as anodic coating material remains on the surface.

Alkali metals are examples of elements that may be suitably anodic to parts formed of magnesium or magnesium alloys. Alkaline earth metals, especially calcium, may also be suitable for this purpose. Thus, a material containing one or more of lithium, sodium, potassium, and calcium may be used so long as the material is electrically conductive and anodic to the underlying magnesium or magnesium alloy article surface. For example, this anodic species material may be used in the form of particles or as a film-like coating.

In another example, a coating based on an intercalated compound is prepared where a metallic species anodic to magnesium like lithium, sodium, or potassium are inserted into a host matrix like graphite or titanium disulfide. For example, lithiated graphite particles may be formed having a composition of $LiC_x$, where x has a value up to about 6 such that the intercalated compound is anodic to the magnesium-containing substrate.

Where the anodic species or constituent alone does not readily bond to surfaces of the magnesium part in a coextensive coating, the anodic constituent may be mixed with a binder composition such as a polymeric binder comprising one or more resins. The binder or matrix material for the anodic species needs to provide suitable electrical conductivity so that the anodic species are consumed electrochemically in their protection of the magnesium or magnesium alloy substrate. Examples of suitable binder materials include electrically conductive polymers such as polyaniline and polypyrrole. An electrically conductive polymer may be used as the sole binder constituent or in combination with a non-conductive polymer for desired overall surface coating properties. Examples of non-conductive binder polymers include epoxy resins, polyurethanes, and acrylic polymers. If a non-conductive polymeric binder material is used without an electrically conductive polymer, the intercalated compound may provide sufficient conductivity, or other conductive materials, or particles may be added.

In some applications the anodic coating will be applied as a primer coating with additional barrier type coating layers applied over the anodic layer for appearance or further protection of the part.

Other objects and advantages of the sacrificial anodic coating for magnesium articles of manufacture will be apparent from a description of illustrative embodiments which follow in this specification.

DESCRIPTION OF PREFERRED EMBODIMENTS

Many commercially available magnesium alloys contain alloying quantities of various combinations of aluminum, manganese, and zinc. Other alloying constituents include rare earth elements, silver, and zirconium. These alloys ordinarily may contain up to about ten percent by weight or so of the alloying constituents and the balance magnesium. These compositions are formulated such that an alloy, or family of alloys, is particularly useful in producing cast parts or wrought parts. For example, magnesium alloys are formulated to produce parts including sand or permanent mold cast parts, die cast parts, cast and rolled sheet and plates, and parts such as extruded bars and rods, tubes, and other solid and hollow shapes.

Many of these alloys are of the solid solution or hypoeutectic type, where intermediary phases are second phase constituents. The principal phase is typically a magnesium-rich phase and any secondary phase(s) is usually richer in the alloying constituent(s). These metallurgical microstructures enable improvements of the magnesium alloy parts, especially cast parts, to be improved by heat treatment. But these same compositions and microstructures provide internal anodic and cathodic sites for corrosion when the surface of a part is exposed to water, air, and salts. The internal microstructural anodic sites are typically provided by the magnesium-rich phase and the cathodic sites are provided by constituents or grains containing other elements in the alloy having a lower electrochemical activity or higher (less negative) corrosion potential. For example, commercial magnesium alloy AM50 has a typical composition, by weight, of about 5 percent aluminum, 0.4% manganese, and the balance substantially all magnesium. The surface of this magnesium-aluminum alloy shows dominantly magnesium-rich (0.8-2.5% aluminum) alpha phase anodic regions and smaller cathodic regions of a beta-phase of substantial aluminum content ($Mg_{17}Al_{12}$). In accordance with this invention, an electrically conductive coating is provided that contains sacrificial species that provide a greater anodic potential than any constituent of the microstructure of the underlying magnesium or magnesium alloy surface.

Figure 1:
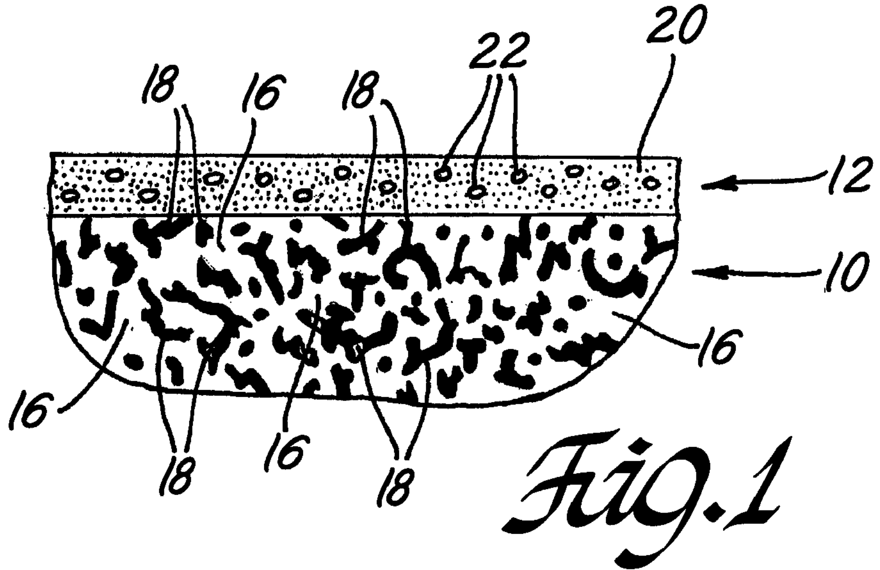
FIG. 1 is a view of an enlarged, surface region fragment of a magnesium alloy vehicle body panel or other automotive vehicle component schematically illustrating a multi-phase microstructure of the part and an overlying coating layer containing lithiated carbon particles in an electrically conductive polymer matrix.
Figure 2:
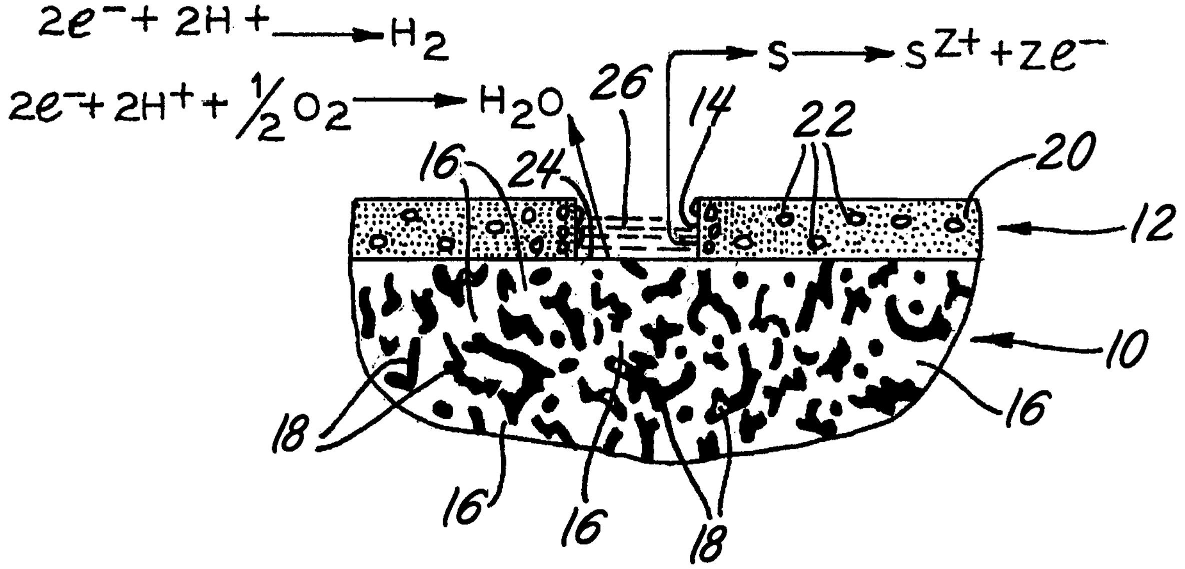
FIG. 2 is an enlarged fragmental view like FIG. 1 showing a water-containing break in the coating layer and illustrating the electrochemical reactions by which the anodic coating is consumed to protect the underlying magnesium alloy part.

The practice of the invention is illustrated schematically in FIGS. 1 and 2 of the drawings. FIG. 1 is an enlarged broken-out portion of a magnesium alloy part 10 containing a composite coating layer 12, formulated in accordance with this invention. Magnesium alloy part 10 may be, for example, a sheet metal automotive vehicle body panel or a cast component for other service on the vehicle. Only a small surface region portion of part 10 is shown in FIGS. 1 and 2 and the illustrated regions of both the part 10 and composite coating layer 12 are enlarged and exaggerated for purposes of schematically illustrating the prevention of corrosion of magnesium alloy part 10. FIG. 2 is a like illustration except that there is a hole 14, tear, or other discontinuity in the composite coating layer 12 that exposes a surface area of magnesium alloy part 10.

The illustrated region of magnesium alloy part 10 has a microstructure comprising a magnesium-rich principal phase 16, illustrated as continuous or matrix phase that contains small clusters or particles of a secondary phase 18 of different composition (often rich in an alloying constituent). The magnesium-rich principal phase 16 is shown in white and secondary phase 18 is illustrated as small irregular shapes in the matrix phase 16. In the microstructure of the magnesium alloy part, the magnesium-rich phase 16 is anodic with respect to the second phase 18.

Composite coating layer 12 comprises a binder material 20 containing dispersed particles (or other forms or shapes) of an anodic species 22 of a material that is electrochemically anodic to both magnesium-rich phase 16 and the secondary phase 18 in the microstructure of part 10. Lithiated graphite particles are an example of a suitable anodic species 22. Binder material 20 provides sufficient electrical conductivity so that the dispersed anodic species 22 can be sacrificially consumed in an electrochemical process (to be described) in protection of the magnesium part 10. For example, binder material 20 may be formed of an electrically conductive polymer such as polyaniline or a mixture of an electrically conductive polymer and another binder polymer material. If necessary, the electrical conductivity of binder material 20 maybe augmented with dispersed particles of a conductive material such as conductive carbon particles. And the dispersed anodic species 22 may contribute to the conductivity of binder material 20.

When, as illustrated in FIG. 1, the composite coating layer 12 is co-extensive with the underlying surface of magnesium alloy part 10, there is no contact and interaction with an external corrosive environment. But when composite coating layer 12 is damaged and a hole 14 formed that exposes a surface portion 24 of magnesium alloy part 10, there is a chemical interaction between, for example, a water and salt containing environment and magnesium alloy part 10 and composite coating layer 12 as illustrated in FIG. 2. Referring to FIG. 2, a pool of ionized water 26 on magnesium part surface 24 in hole 14 provides the electrolyte for an electrolytic cell in which particles of sacrificial anodic species 22 in conductive coating layer 12 constitute an anode and the secondary phase grains 18 and/or primary phase 16 in part 10 constitute a cathode. The sacrificial anodic species 22 (represented by S in the following equation) in the composite coating layer 12 is oxidized ($S \rightarrow S^{z+} + ze^-$) and enters the aqueous electrolyte 26. Concurrently, hydrogen ions in the electrolyte are reduced to hydrogen and water (in accordance with the equations in FIG. 2) at the primary phase 16 or secondary phase 18 in magnesium alloy part 10, both of which phases are cathodic to the sacrificial anodic species 22 in the composite coating layer 12. In this way, the anodic species 22 in composite coating 12 are oxidized and consumed. But the cathodic magnesium part 10 is preserved as long as sacrificial anodic species 22 in coating 12 are available at the corrosion site.

In accordance with a preferred embodiment of the invention, coatings are used that contain intercalated compounds where metals anodic to magnesium like lithium, sodium, and potassium are inserted in a host matrix of, for example, graphite or titanium disulfide ($TiS_2$). Such materials are suitable as a host material because of their natural layered or sheet structures.

In accordance with a known procedure in inorganic chemistry, lithiated carbon can be made by direct combination of lithium with carbon. Powders of both elements are mixed at room temperature to form the electrically conducting intercalation compounds, also called lamellar compounds [F. A. Cotton and G. Wilkinson, "Advanced Inorganic Chemistry," $5^{th}$ edition, Wiley, p 238, 1988]. The atoms of the intercalated elements (Li, Na, or K) are inserted between the layers of graphite. As taught in inorganic chemistry textbooks, slight heating to less than 100° C. can speed the insertion process. Carbon nanotubes also accept lithium atoms.

The lithiation of carbon can also be accomplished electrochemically. A lithium compound dissolved in a suitable electrolyte can be deposited in a graphitic carbon cathode and, thus, intercalated in the layered carbon. For example, a 0.5M solution of lithium hexafluorophosphate dissolved in equal portions of diethyl carbonate and ethylene carbonate may be used as the electrolyte.

A fully lithiated carbon contains lithium in the proportion $LiC_6$ and provides a material that is anodic to magnesium and most commercial magnesium alloys. The electrode potential of the intercalated carbon can be modified to a desired voltage level by controlling the metal content of the intercalated graphite. Reducing the metal content reduces the anode character of the metal-filled carbon by raising its voltage (relative to a lithium reference electrode).

As reported in M. W. Verbrugge and B. J. Koch, "Electrochemical Analysis of Lithiated Graphite Anodes," J. Electrochem. Soc., 150(2003) A374), the potential of lithiated graphite is altered by the insertion of Li into the graphite host material. It was found that the potential of a fully intercalated carbon, $LiC_6$ is about −3 V relative to the standard hydrogen electrode. This potential may be compared, for example, with the anodic potential of magnesium alloy AZ91 (by weight, about 9% aluminum and 1% zinc). AZ91 begins to corrode at about −1.4 V relative to the standard hydrogen electrode, which corresponds to a very small Li concentration in graphite; thus rather dilute concentrations of Li in graphite can be used to construct materials that are anodic to AZ91. Disordered carbons (partially graphitic) can also be used. In this case the voltage versus intercalate concentration is more easily controlled at dilute lithium concentrations. Similar voltage-concentration relationships hold for the intercalation of Na and K in carbons and the intercalation of Li, Na, and K in various other host materials (e.g., $TiS_2$).

The anodic species used to protect the magnesium or magnesium alloy part is applied to surfaces of the part as an adherent and electrically conductive coating. In many instances the anodic species alone will not suitably adhere to the magnesium substrate and a suitable binder system will be required. There are many polymeric binder systems that can be suitably adapted for this purpose. Particles of the anodic species are mixed with the binder composition, or a precursor of the binder composition, and the mixture applied to surfaces of a magnesium or magnesium alloy part. The mixture, including a binder or its precursor, may be applied to surfaces of the part by any method applicable to the chemical and physical properties of the binder. The binder system may comprise mainly dry constituents or may be formulated as a solvent or water based system for deposition. For example the binder (with included anodic species) may be applied to the substrate surface by electrocoating, spray coating, roller coating, electrostatic coating, dip coating, or the like. The anodic species-binder mixture is then cured, dried, or otherwise processed to form a suitably durable and adherent coating on the part. Radiation curing or thermal curing may be employed.

Polymers that are inherently electrically conductive may be used as the binder system for the anodic species, or as an integral part of a binder system. Examples of inherently conductive polymers include polyaniline, lignosulfonic acid-doped polyaniline, polypyrrole, polythiophene, polyacetylene, poly(p-phenylene), poly(p-phenylene vinylene), poly (p-phenylene sulfide), and polyaniline substituted with alkyl, aryl, hydroxy, alkoxy, chloro, bromo, or nitro groups. In some instances monomeric precursors of one or more of these electrically conductive polymers can be dispersed in a suitable electrolyte with thoroughly dispersed particles of the anodic species and electrodeposited on the magnesium part (s) arranged as a cathode in the deposition process. Where this known practice is applicable with the magnesium or magnesium alloy substrate, the electrocoated part is removed from the electrolytic bath and rinsed, dried, or otherwise suitably treated to provide a magnesium part with sacrificial anodic species dispersed in a coextensive, adherent, and inherently conductive binder layer.

When treating magnesium or magnesium alloy parts where it is not desired to electrocoat the parts, or it is impractical to electrocoat them, an electrically conductive polymer or mixture of electrically conductive polymer with another polymer may be applied by other coating practices to incorporate the anodic species and bond it to the parts. Here a second resin binder, mixed with suitable portions of anodic species and electrically conductive resin, is applied to the surfaces of the magnesium parts to be protected.

Examples of suitable binder resins include one or more of polyurethanes, epoxies, neutral resins, acidic resins, acrylates, polyesters, and glycidyl acrylates. Such non-conductive binder resins may require a curing agent such as a sulfonamide, an anhydride type curing agent, a free radical photoinitiator, a cationic photoinitiator, an amine curing agent, or the like. Where the binder mixture is cured on the surface of the magnesium part, binder precursor formulations may be prepared in two or more resin parts (at least one part containing the anodic species) and the resin parts combined during coating application.

In some applications it may be suitable to enhance the electrical conductivity of the polymeric binder system with a relatively small molecule electrically conductive additive such as a tannin, o-catechol, p-catechol, 1,4-phenylenediamine, 1,2-phenylenediamine, a trimer of aniline (i.e. oxidative polymerization product of 1 mole of 1,4-phenylenediamine and 2 moles of aniline), and any of several organic dyes.

The coating of the anodic species may be used as a first layer or primer coating with a later applied, overlying second coating used for further protection or decorative or other purposes.

In another embodiment of the invention, metal compositions that are suitably anodic to the magnesium part may be formulated and applied as a thin metallic coating layer to the surfaces to be protected. Again, special formulations of alkali and alkaline earth metals may be devised for this purpose and electroplated or otherwise applied to the surfaces of the part.

Sacrificial coating systems comprising anodic species developed for corrosion protection of specific magnesium or magnesium alloy parts may be evaluated using a salt spray test. Coated magnesium alloy panels may be intentionally scribed and tested under salt spray in a salt spray chamber in accordance with the procedure outlined in ASTM B117-95.

Thus, the practice of this invention has been illustrated by a few specific examples. But in a broader sense the invention involves the selection and use of a coating for a magnesium or magnesium alloy part where the coating is anodic to the magnesium microstructure and is sacrificially consumed by corrosive reactions when the surface of the part and the coating are exposed in an electrochemical combination.

The invention claimed is:

1. A magnesium or magnesium-based alloy article having a surface with a corrosion resistant surface coating adhering in direct contact and co-extensive with the magnesium-based alloy article surface, the corrosion resistant surface coating comprising an alkali metal-intercalated graphite or titanium disulfide, the surface coating being electrically conductive and electrochemically anodic with respect to the surface of the article.

2. A magnesium or magnesium alloy article as recited in claim 1 in which the surface coating comprises particles of an alkali metal-intercalated graphite in an electrically conductive polymer matrix.

3. A magnesium or magnesium alloy article as recited in claim 1 in which the surface coating comprises particles of lithium-intercalated graphite in an electrically conductive polymer matrix.

4. A magnesium or magnesium alloy article as recited in claim 1 in which the surface coating comprises particles of lithium-intercalated graphite in an electrically conductive polymer matrix comprising at least one of polyaniline or polypyrrole.

5. A magnesium or magnesium-based alloy article having a surface with a surface coating resistant to corrosion of the magnesium surface in a water-containing environment, the surface coating adhering in direct contact and co-extensive with the magnesium-based alloy article surface, the corrosion resistant surface coating comprising an alkali metal-intercalated graphite or titanium disulfide and being electrically conductive and electrochemically anodic with respect to the surface of the article.

6. A magnesium or magnesium alloy article as recited in claim 5 in which the surface coating comprises an alkali metal-intercalated graphite.

7. A magnesium or magnesium alloy article as recited in claim 5 in which the surface coating comprises particles of lithium-intercalated graphite in an electrically conductive polymer matrix.

8. A magnesium or magnesium alloy article as recited in claim 5 in which the surface coating comprises particles of lithium-intercalated graphite in an electrically conductive matrix comprising at least one of polyaniline or polypyrrole.

* * * * *